United States Patent
Caswell et al.

(10) Patent No.: US 6,178,502 B1
(45) Date of Patent: Jan. 23, 2001

(54) SPECIFYING COMPLEX DEVICE CONFIGERATION THROUGH USE CHARACTERISTICS

(75) Inventors: Nathan S. Caswell, Yorktown Heights, NY (US); Anil Nigam, Stamford, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/571,275

(22) Filed: May 16, 2000

(51) Int. Cl.[7] ............................. G06F 9/00; G06F 19/00
(52) U.S. Cl. .................................. 713/1; 713/100; 700/97
(58) Field of Search ...................... 713/1, 100; 709/220, 709/221; 710/8, 10; 700/97, 103

(56) References Cited

U.S. PATENT DOCUMENTS

| | | | |
|---|---|---|---|
| 5,452,238 | * 9/1995 | Kramer et al. | 395/500.01 |
| 5,564,061 | * 10/1996 | Davies et al. | 710/64 |
| 5,825,651 | * 10/1998 | Gupta et al. | 364/468.09 |
| 5,946,210 | * 8/1999 | Montminy et al. | 700/97 |

* cited by examiner

Primary Examiner—Dennis M. Butler

(74) Attorney, Agent, or Firm—McGuireWoods LLP; Stephen C. Kaufman

(57) ABSTRACT

A method for relating a specific configuration of complex units constructed from components with standardized interfaces to the user characteristics of the complete unit. The invention provides a bidirectional mapping between a statement of value to the user through the computation of fitness for a particular purpose (or "use") and a technical configuration. The customer can be presented with a system optimized for a particular use at a particular price point. Through presenting a range of systems around the optimum point and presenting the strength of the system for a variety of uses as the customer varies components, a wide range of customer choice is presented within an understandable range of choices. Each component is characterized by a strength parameter, and the set of components is arranged as a vector. This configuration vector can then be projected on a vector representing a standard use. Particular configuration vectors are characterized by a direction and a magnitude. The magnitude represents an overall strength of a configuration related to the performance or capacity of its individual components. The direction of a general configuration vector can be compared to the direction of a configuration tuned for a particular purpose or use. Similarly, a configuration can be constructed by scaling its magnitude along the direction defined by a tuned configuration and varying the direction to optimize among various uses.

9 Claims, 5 Drawing Sheets

SPECIFYING COMPLEX DEVICE CONFIGERATION THROUGH USE CHARACTERISTICS

BACKGROUND OF THE INVENTION

1. Field of the Invention

The present invention generally relates to specifying customized complex device configurations for manufacture and, more particularly, to relating a specific configuration of complex units constructed with components with standardized interfaces to use characteristics of the complete unit.

2. Background Description

Determining the configuration of a mass customized unit to suit a particular customer can be divided into three steps. First is establishing what the customer wants and needs, then relating that to a specific configuration of the mass customized unit, and finally establishing that the configuration can be built. The problem solved by the subject invention is that of enabling the customers to work directly with terms and quantities of value to them while simultaneously producing a configuration of technical components suitable for manufacturing. The assumption of a mass customized unit implies that in the predominance of cases the actual customer derived configuration or one indistinguishably close to it can actually be built at no incremental cost.

Complex mass customized units can have a bewildering array of possible configurations. The number of distinct combinations for Motorola pager products is around 30 million and can be several billion for "simple" desk top personal computers (PCs). The configuration is the combination and arrangement of the standardized components that comprise the unit. In some cases, such as Burger King® Hamburgers, the components (pickles, lettuce, ketchup, etc.) represent choices based on customer evaluation of each component independently. More generally, the customer evaluation criteria will depend on combinations of the components making direct customer selection of the components problematic.

Customer criteria relate to a use or range of uses for which the unit must provide utility. These criteria are captured in the phrase "fitness for a particular use". For example, PCs are used as basic communication units (e-mail/browser functions), game units (audio, 3-D visual intensive), office productivity units, and shared units providing file, print, and application services. A configuration tuned for one of these uses would contain, to a large extent, a set of components similar in type to that for other uses. The variation is in the relative "strength", such as speed or capacity, of the individual components. The fitness for a particular use cannot be specified or determined through a single component, since it depends on all the components in the configuration.

Similar to the intuitive notion of "strength" for a particular component there will be an overall strength of a configuration ranging, for example, from "occasional home use" to "industrial strength" or from "economy" to "deluxe". Moving to a stronger or weaker configuration, with its impact on price, may mean making wholesale changes to the components in a configuration. Both the fitness for a particular purpose and strength of a configuration for that purpose are subjective criteria that will vary over time. New uses and new components appear regularly and either increase the strength of components or units, or decrease the cost for a given strength.

Historically, the method for dealing with various uses of a unit is to create separate brands targeted at a broadly associated range of uses (or market segment) with a range of specific products within the brand. The range within a brand may vary over a small range of related uses or by unit strength. Reducing the selection to a series of fixed, specific products for the customer to choose from relies on the observation that markets naturally segment around a few points so that competing products can be compared. The market segments for compact, midrange, and luxury cars are an example. More subtly, it is also predicated on the presumed high cost of engineering a working product and of the lead time associated with offering such a product. In this product centric method a primary task of a marketing organization is prediction of customer requirements as input for product development.

The product centric method has two significant drawbacks. First is the obvious limitation of customer choice to a limited set of configurations. Customer wants and needs that vary from these configurations are either unsatisfied or satisfied through a costly special bid process replicating much of the original product development cycle. The second drawback appears when a customer or market segment develops requirements that fall between the recognized brands. Such requirements may occur in a dynamic market where segment shifts driven by both new uses and new technology may emerge rapidly compared to the product development cycle time. These drawbacks highlight the fact that customer needs are being force fit to a small set of discrete points within fixed boundaries.

An adaptation of the product centric method to allow greater flexibility is definition of "product families" consisting of a base product with optional substitutions or additions. While this addresses the customers' specific technical configuration needs (such as a larger direct access storage device (DASD), e.g. hard drive, than in the base product) it does not address the core need to describe the value of the change for satisfying the needs of a particular use.

SUMMARY OF THE INVENTION

It is therefore an object of the present invention to provide a method for relating a specific configuration of complex units constructed from components with standardized interfaces to the user characteristics of the complete unit.

According to the invention, each component within a configuration is characterized by a "strength" parameter, and the set of components is arranged as a vector. This configuration vector can then be projected on a vector representing a standard use.

The invention represents possible unit configurations as a vector, the "configuration vector", in a multi-dimensional space whose basis vectors (orthogonal dimensions) represent the set of available component types. Particular configuration vectors are characterized by a direction and a magnitude. The magnitude represents an overall "strength" of a configuration related to the performance or capacity of its individual components. The direction of a general configuration vector can be compared to the direction of a configuration tuned for a particular purpose or use. Similarly, a configuration can be constructed by scaling its magnitude along the direction defined by a tuned configuration and varying the direction to optimize among various uses. Decomposition of the vector so obtained into its basis vectors, i.e. its components, directly connects the use and strength of a configured unit with its physical configuration.

Most uses, and configuration vectors, will have zero strength for many components. Furthermore, some components may not contribute to any use. It is also assumed that a zero strength instances of every component exists so the optimum solution for some basic systems is to leave that component out. By gathering these components into an "up-sell" use and scaling it by the strength of the optimized or specified system under consideration by the customer, a set of appropriately matched options can be offered.

The primary advantage of this invention is that it provides a bidirectional mapping between a statement of value to the user through the computation of "fitness for a particular purpose" (or "use") and a technical configuration. When coupled with price, the mapping can be made unique.

The customer can be presented with a system optimized for a particular use at a particular price point. Through presenting a range of systems around the optimum point and presenting the strength of the system for a variety of uses as the customer varies components, a wide range of customer choice is presented within an understandable range of choices.

From a technical perspective, the computation and presentation machinery is independent of any particular set of components. All data are encapsulated as a property of a particular component without any global relationships. Changes can be freely and independently made to each component. Components can be added or removed from the available set at will.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
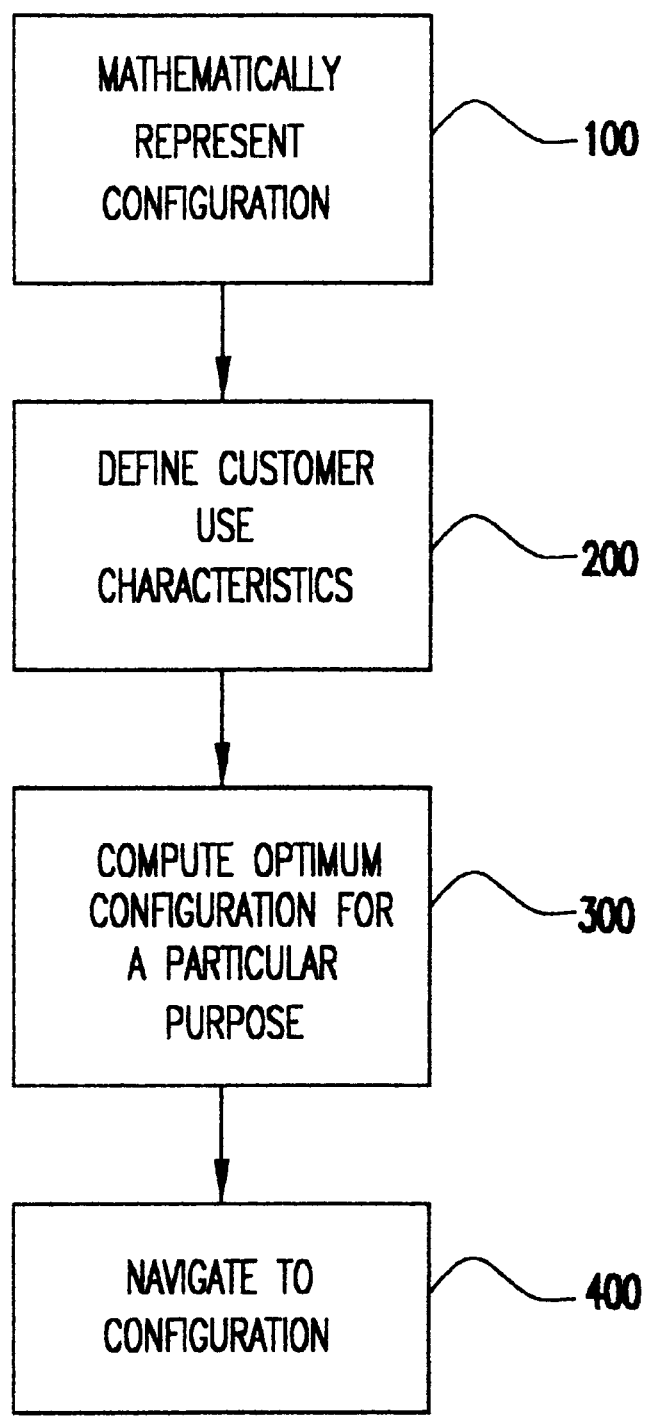
FIG. 1 is a flow diagram showing an overview of the method of the present invention.

Referring now to the drawings, and more particularly to FIG. 1, there is shown a flow diagram that provides an overview of the method of the present invention. Each block will subsequently be discussed in further detail in the specification. In block 100, the configuration is represented mathematically. In block 200, customer use characteristics are defined, where there is a mapping from component set to customer use. In block 300, an optimum configuration for a particular purpose is computed from the use characteristics, where there is a mapping from customer use to component set. Finally, in block 400, the configuration may be navigated, where a configuration through use characteristics is selected.

Mathematical Representation

Figure 2:
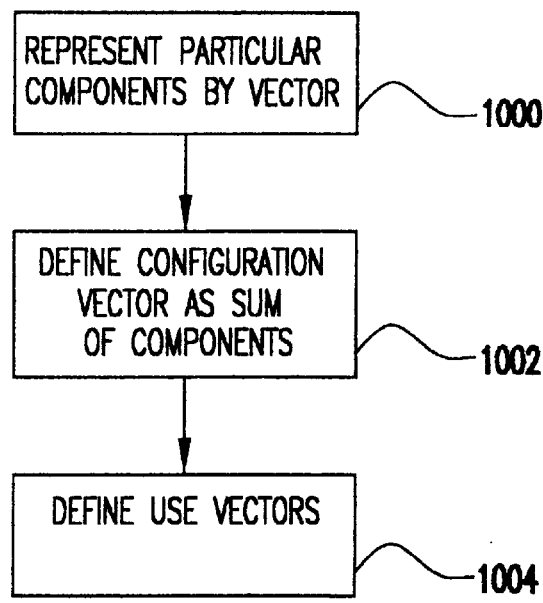
FIG. 2 is a flow diagram showing the steps involved in characterizing the relationship between the use of a unit and a configuration vector.

Referring now to FIG. 2, which shows block 100 in further detail, block 1000 shows that particular components are represented by a vector. In particular, the vector is defined as $\vec{c}_{ij} = |\vec{c}_{ij}|\hat{c}_i$, where the direction, $\hat{c}_i$, represents the $i^{th}$ component type and the magnitude, $|\vec{c}_{ij}|$, represents the strength (a metric of performance or capacity) of the $j^{th}$ component of that type. The caret, or hat, notation for a vector indicates that the vector has unit magnitude and is generally reserved for the basis vectors of a space. The basis vectors are a set of orthogonal vectors that span the space. They can be thought of as the dimensions of the space where changing the value of one dimension has no effect on the values of other dimensions. Note that while the strength of a particular component has a particular value, a general component can be represented by $\vec{c}_i = \sigma \hat{c}_i$, where $\sigma$ is a scalar strength assigned to the component.

As shown in block 1002, a configuration, C, is defined as a set of components $$C = \{\vec{c}_{ij}\},$$

which can be represented by the vector sum of its components $$\vec{C} = \sum_{\vec{c}_{ij} \in C} \vec{c}_{ij}.$$

Figure 3:
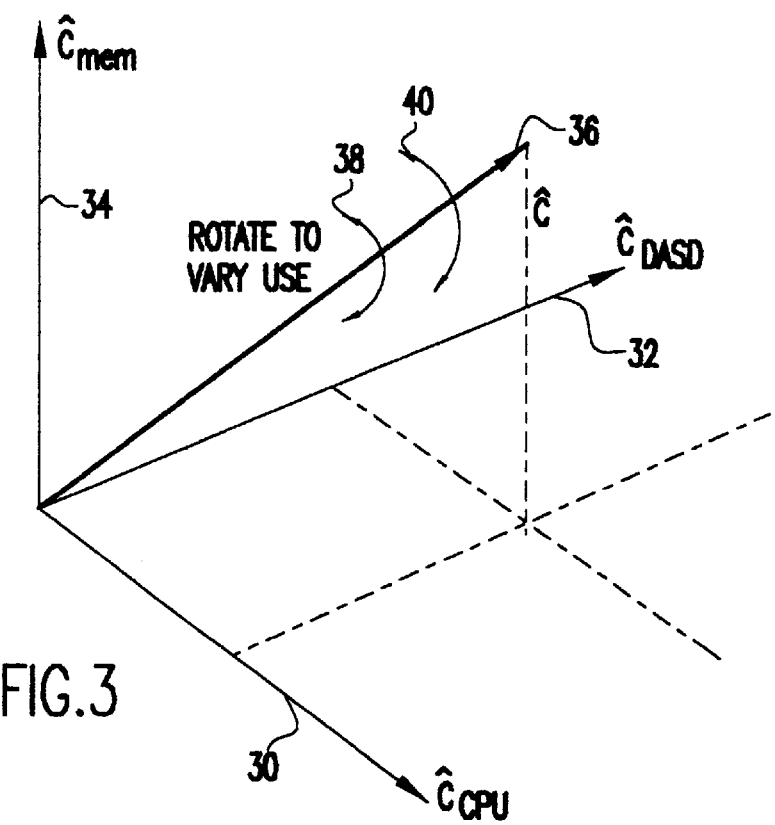
FIG. 3 is a graphical representation of a configuration vector in a simple configuration space.

The quantity, $\vec{C}$, is denoted the configuration vector. As with components, the magnitude of the vector, $|\vec{C}|$, is a measure of the overall strength of the configured unit. Basic units have a small magnitude while state of the art units will have a large magnitude. A sketch showing a configuration vector and its interpretation is shown in FIG. 3.

The configuration vector also has a direction, expressed by the unit vector, $$\frac{\vec{C}}{|\vec{C}|},$$

that describes the relative strengths or balance between the components. Since the balance between components is what determines how well a unit will perform in a particular application, the direction of the configuration vector is interpreted as describing "use".

Quantification of "use" is problematic although it is possible to recognize and design units that are tuned for a particular named use. As shown in block 1004 in FIG. 2, configurations tuned for a particular use are characterized by their direction, denoted by $$\hat{c}^u \frac{\vec{C}^u}{|\vec{C}^u|}$$

and referred to as use vectors. As with the actual configuration vector shown above, a use vector can be decomposed into its components $$\hat{C}^u = \Sigma \sigma_i^u \hat{c}_i,$$

where $\sigma_i^u$ is a normalized strength. This strength may be either specified according to some theory or derived from a reference configuration by $$\sigma_i^u = \frac{\vec{c}_{ij}}{|\vec{c}_{ij}|}.$$

Configurations tuned for clearly independent uses "overlap" in that they have many of the same components. This is represented by the simple fact that the use vectors are not orthogonal to each other. It has the consequence that the use vectors do not provide an independent basis set for configuration vectors.

As shown in FIG. 3, the configuration vector 36 is illustrated in a simple configuration space defined by the three axes 30, 32 and 34. In the context of a personal computer (PC), the three axes 30, 32 and 34 represent a central processing unit (CPU), a direct access storage device (DASD), and memory (mem), respectively. Once the configuration vector 36 has been defined, it may be rotated about the origin in any way to vary use as shown by arrows 38 and 40.

From these basic definitions for components, configuration vectors and use vectors, a variety of transformations relating the use characteristics of a configuration or generating a configuration from use characteristics are available through linear algebra constructs.

Mapping Configuration to Use

A way to characterize the relationship between "use" of a unit and a configuration vector is to define "fitness for a particular purpose", $\phi^u$. This is the normalized projection of the configuration vector onto the use vector $$\phi^u(\vec{C}) = \frac{\vec{C}}{|\vec{C}|} \cdot \hat{C}^u,$$

where $0 \le \phi^u \le 1$. A result of 1 indicates that the configuration is tuned for that particular purpose. An application of this quantity in evaluating a configuration is to display it for a variety of uses. Note that the set of $\phi^u$ cannot be represented by a vector since they are not independent of one another.

Figure 4:
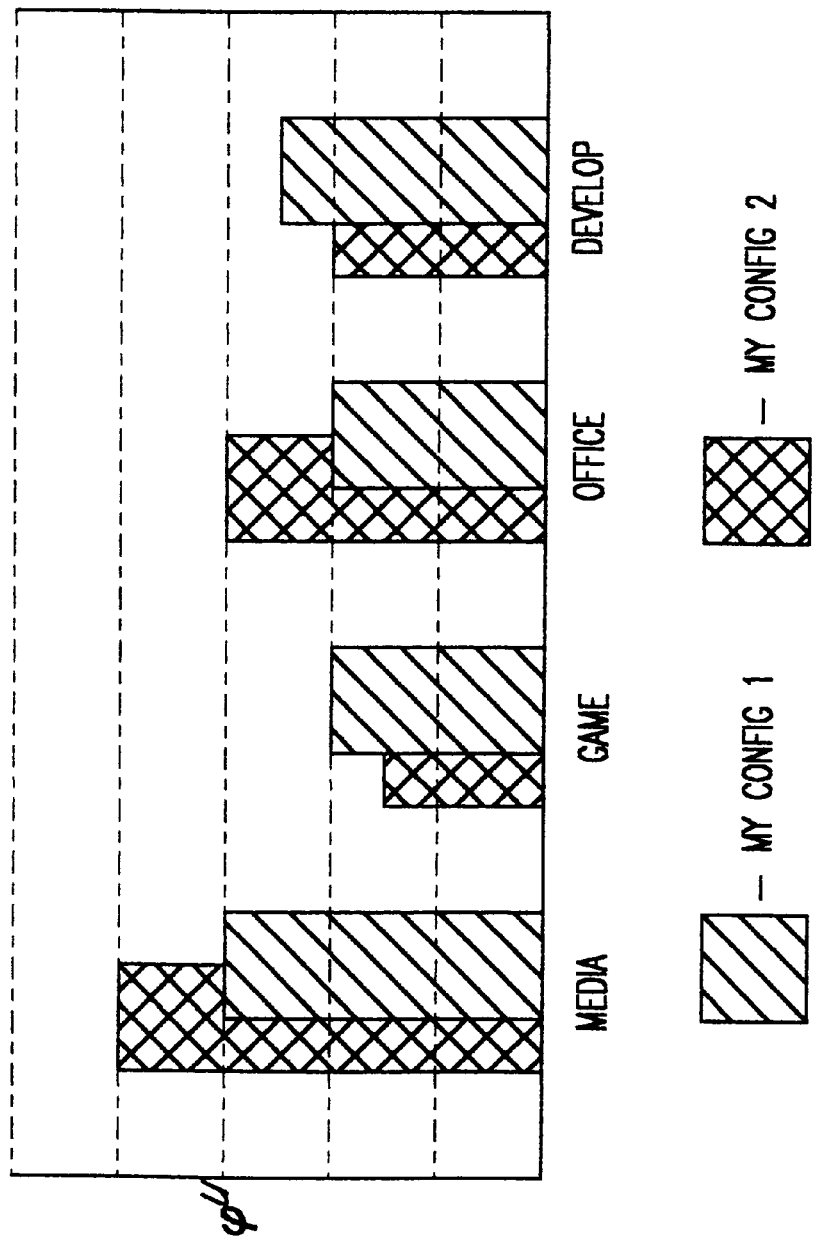
FIG. 4 is a bar graph comparison of configurations displayed through the fitness for a particular purpose parameter.

FIG. 4 shows that as the configuration is varied, the change may then appear visually in the form of a bar chart that indicates "more of this use", "less of that use". The display shown in FIG. 4 can be extended and modified in several ways by adding overall strength information. The simplest way to do this is to add a magnitude bar showing the relative overall strength of configurations. The strength can be mixed into display of each use by varying the normalization. Displaying $\phi^u |\vec{C}|$ may give a better view of systems intended for multiple uses. Changing components "detunes" the unit for a particular purpose but compensates by an overall increase in strength. If there is a primary intended use, keeping that constant and showing other uses relative to it might be helpful.

For units such as PCs, there is a minimum configuration, $\vec{C}^{min}$, required to simply run the operating system. When this is the case it can be accounted for by the replacement $$\vec{C} \rightarrow \vec{C} - \vec{C}^{min}.$$

Doing this has the interesting consequence that the zero strength version of a unit tuned for any use is just the minimum unit. It should also have the result of decreasing the overlap and thereby increasing the distinction between the use vectors.

Mapping Use to Configuration

Figure 5:
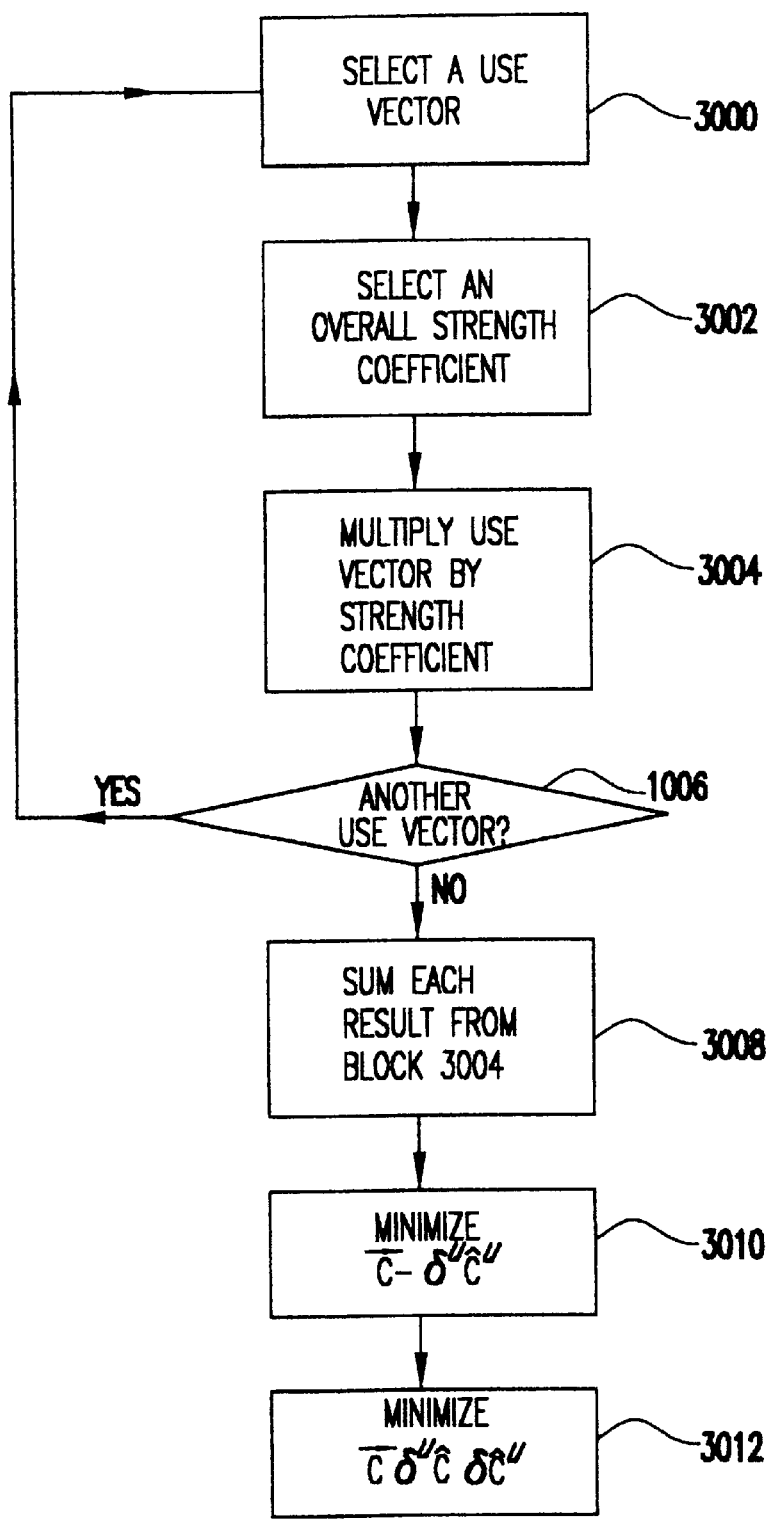
FIG. 5 is a flow diagram showing the method of mapping a use to a configuration.

In addition to characterizing a given configuration for a particular purpose, it is possible to compute an optimum configuration for a particular purpose. As shown in steps 3000 and 3002 of FIG. 5, a use vector, $\hat{C}^u$, and overall strength coefficient, $\sigma^u$, are selected. In block 3004, the use vector and the strength coefficient are multiplied together. In decision block 3006, a test is made to determine if there is another use vector. If so, the process returns to block 3000 and repeats. If not, each result from block 3004 is summed in block 3008.

By selecting a use vector $\hat{C}^u$ and an overall strength coefficient $\sigma^u$, the strengths of the constituent components for a configuration can be written by inspection as $$\vec{C} = \Sigma \sigma^u \sigma_i^u \vec{c}_i,$$

where the desired strength of each component type is determined by the coefficient $$\sigma_i = \sigma^u \sigma_i^u.$$

As a practical matter, there is a discrete and probably fairly small set of components to select from so for all j, $\sigma_i \ne |\vec{c}_{ij}|$. Without loss of generality, we can assume that with the addition of a zero strength component ($\vec{c}_{i0}$, $|\vec{c}_{i0}| = 0$, no component at all) and in infinite strength component ($\vec{c}_{i\infty}$, $|\vec{c}_{i\infty}| = \infty$, a component stronger than any available) the desired strength will in fall between two actual component strengths. In block 3008, each result obtained in block 3004 is stored. An actual configuration can then be optimized with respect to the desired configuration either by selecting a configuration as close as possible to the ideal configuration (minimizing $|\vec{C} - \sigma^u \hat{C}^u|$) as shown in block 3010, or as close as possible to the intended use (minimizing ($\vec{C} - \sigma^u \hat{C}^u) \cdot \sigma^u \hat{C}^u$) as shown in block 3012. Rewriting in terms of the strengths, the first case (block 3010) gives $$\Delta^2 = \Sigma (|\vec{c}_{ij}| - \sigma_i)^2,$$

where $\Delta^2$ is the squared distance from the actual configuration to the desired configuration. In this case the minimum is clearly obtained by individually choosing the components closes to the desired strength. In the second case (block 3012), $$\Delta^2 = \Sigma \sigma_i (|\vec{c}_{ij}| - \sigma_i),$$

which measures the normal distinct to the desired configuration vector. In this case a better fit may be obtained by balancing the components with $|\vec{c}_{ij}| > \sigma_i$ against the components with $|\vec{c}_{ij}| < \sigma_i$.

In practice, the ability to generate an actual configuration from specification of a use and a strength depends on the ability to present the customer with options. The objective is to offer a choice between a small number of similar systems. One choice is between the two optima described above. Another is to utilize heuristics based on the position of $\sigma_i$, in the range $|\vec{c}_{ij}| < \sigma_i < |\vec{c}_{ij+1}|$. The obvious choice is to offer the components that straddle the desired point, but this results in $2^N$ options, where N is the number of components. One strategy for limiting the number of choices is to only offer a choice of those components close to the center, $$\left(\frac{(\sigma_i - |\vec{c}_{ij}|)}{(|\vec{c}_{ij+1}| - |\vec{c}_{ij}|)}\right) \cong 0.5,$$

of the range (assuming that the closest component is selected otherwise). By adjusting the tolerance, three to five components can be selected to vary. The set of eight to sixty-four configurations generated in this way can be further reduced by ranking them according to $\Delta^2$ and only presenting the top selections. A heuristic that generates weaker as well as stronger choices is to offer a step down as well as a step up for components where $\sigma_i = |\vec{c}_{ij}|$. The same procedure of selecting from a $\Delta^2$ ranking would be followed.

A powerful method for finding candidate configurations among the near neighbors of a desired configuration vector is through the general class of proximity problems addressed by Vomoi polygons (also known as Diriclet regions). For a detailed discussion of proximity problems, see Preparata and Shamos, *Computational Geometry, An Introduction*, Springer-Verlag (1985). A Vomoi polygon around a point in a set of points is the region of space closer to that point than to any other point. A Vomoi diagram is the set of Vomoi polygons (some of which are open) around all the points in the set. The faces of a Vomoi polygon are the perpendicular bisectors of the lines joining a point with its nearest neighbor points and the convex hull formed by this set of nearest neighbor points has exactly one point (the original point) in its interior.

Navigating to Configuration Through Use

With the ability to project a configuration onto the use vectors and find a small set of actual configurations around an arbitrary configuration vector, a customer can navigate through the potentially enormous number of possible configurations by controlling the magnitude and direction of the configuration vector.

If it is the case that the customer wants to optimize for a single use, the only adjustable parameter is the overall strength. The direction is simply taken to be the direction of the use vector.

Figure 6:
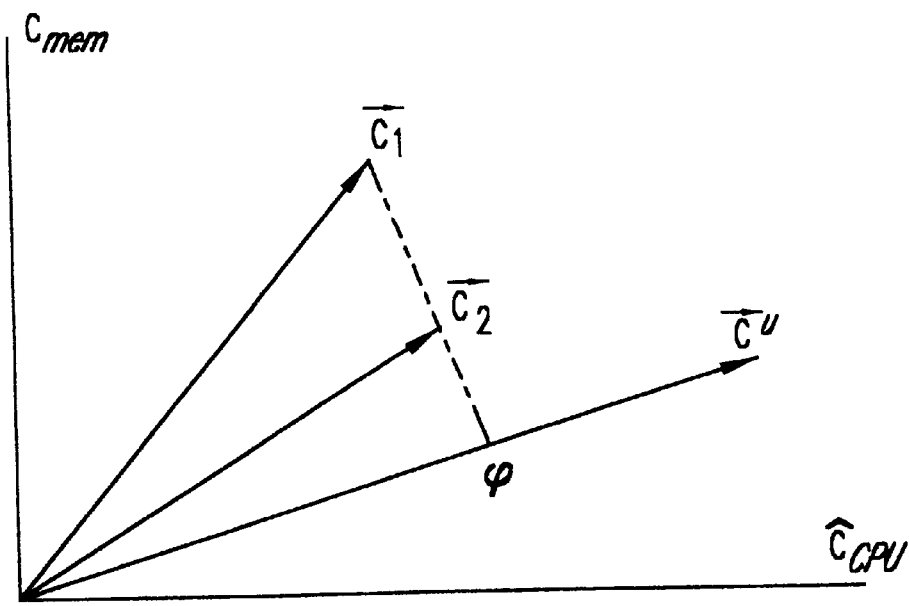
FIG. 6 is a graphical representation showing that a projection on a use vector does not uniquely determine the configuration.

This is not quite what is desired, however. Because configurations for various uses overlap, it is possible for the use to adjust the configuration of the system for a suitable balance between different uses. The quantities useful to the customer are the $\phi''$ "fitness for a particular purpose" of the configuration. Each use vector has a well defined direction, but this does not directly translate into a "use" interpretation of direction. As shown in FIG. 6, $\phi''$ measures the length of the configuration vector in the direction of the use vectors (i.e., its projections). The configuration required to produce a particular use vector is not unique. The issue in navigation is how to change the direction and magnitude of the configuration vector to produce the desired changes in its projections on various use vectors.

Figure 7:
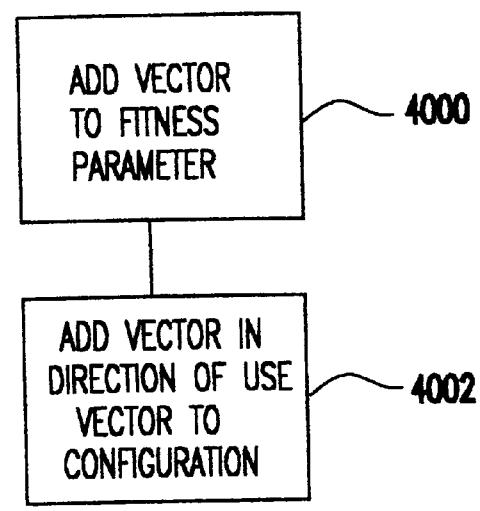
FIG. 7 is a flow diagram showing the steps of navigation to a configuration through use.

As shown in FIG. 7, the recommended method for navigating the configuration space is through manipulation of the desired $\phi''$ and the overall magnitude. While multiple $\phi''$ can be displayed, they are not independent of each other so it is necessary to select one $\phi''$ which will be changed at any given time. The convention adopted is that when $\phi''$ is changed ($\phi'' \rightarrow \phi'' + \delta$), as shown in block 4000, a vector of length 6 in the direction of the use vector is added to the configuration $$\vec{C} \rightarrow \vec{C} + \delta \vec{C}^u$$

as shown in block 4002. Increasing a $\phi''$ has two possible interpretations: the intent is either to change the balance between the $\phi''$ while keeping the overall strength of the configuration constant (i.e., changing only the direction of the configuration vector) or to increase the strength of the configuration for the selected use. The first case amounts to re-normalizing the result of the transformation above. Implementations should allow a user choice of these interpretations.

Example of PC Assembly

Referring again to FIG. 3, components are often represented by more than one dimension. For example, with DASD components, shown on the axis, characteristics such as speed (5400 RPM, 7000 RPM, 10000 RPM) or capacity (1.2 GB, 6 GB, 36 GB) may vary independently.

Some components may be integrated with other components. The prime example of this is the PC "motherboard", or system planar, which contains the processor and sockets for adapter cards and system memory. In current practice it also incorporates a parallel port, serial ports, keyboard and mouse ports, two channels of integrated device electronics (IDE) disk control, and various input/output (I/O) bus controllers. It may additionally contain sound, video, SCSI (small computer system interface) disk controller, or LAN (local area network) adapter functionality. The primary complication from composite components is that they are less expensive than a collection of separate components with the same strength because of their integration and typically cannot be upgraded for the same reason. The trade-off between price and flexibility could be folded into the component strength. The exact weighting is likely to be strongly customer dependent so the better solution is simply to offer both and let the customer make the choice.

Some configurations may contain multiple instances of some components. Memory and DASD are prime examples of this type of component. For computing $\phi''$ the strengths of the components simply add. For components were there are equivalent choices (one 64 MB SIMM (system in-line memory module) or two 32 MB SIMMs, for example) another mechanism must be defined. One option is to either make the multiple component stronger or weaker than the single component by adjusting the individual component strengths to the multiple have the correct relation ship. The most general, and preferred, option is to simply define a single "virtual component" consisting of the two individual components and assign its strength as desired. In any case, presenting the customer with the flexibility choice discussed in the previous paragraph is possible.

Most uses, and configuration vectors, will have zero strength for many components and some components may not contribute to any use. It is also assumed that a zero strength instance of every component exists sot the optimum solution for some basic systems is to leave the component out. By gathering these components into an "up-sell" use and scaling them by the strength of the optimized or specified system under consideration by the customer, a set of appropriately matched options can be offered.

The primary advantage of this invention is that it provides a bidirectional mapping between a statement of value to the user through the computation of "fitness for a particular purpose" (or "use") and a technical configuration. When coupled with price, the mapping can be made unique.

The customer can be presented with a system optimized for a particular use at a particular price point. Through presenting a range of systems around the optimum point and presenting the strength of the system for a variety of uses as the customer varies components, a wide range of customer choice is presented within an understandable range of choices.

Form a technical perspective, the computation and presentation machinery is independent of any particular set of components. All data are encapsulated as a property of a component without any global relationships. Changes can be freely and independently made to each component. Components can be added or removed from the available set at will.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for relating a specific configuration of units constructed from a plurality of components with standardized interfaces to the user characteristics of the complete unit, comprising the steps of:

developing a mathematical representation of a unit configuration comprised of a plurality of components as a configuration vector;

developing a mathematical representation of a use vector that defines a use of the unit configuration;

characterizing the relationship between the use vector and the unit configuration;

computing an optimum unit configuration for a particular use; and manipulating the configuration vector in the vicinity of the use vector to view configurations.

2. The method as recited in claim 1, wherein in the step of developing a unit configuration comprises the steps of:

representing a particular component by a vector;

determining a configuration comprised of a set of components; and determining a configuration vector that is comprised of a vector sum of the components.

3. The method as recited in claim 2, wherein the configuration vector has a direction that describes the use of each component.

4. The method as recited in claim 2, wherein the characterizing step comprises the step of making a normalized projection of the configuration vector onto the use vector.

5. The method as recited in claim 4, wherein the manipulating step comprises the steps of:

adding a fixed length to the normalized projection of the configuration vector onto the use vector;

multiplying the fixed length by the configuration use vector; and adding the resultant product of step b to the configuration use vector.

6. The method as recited in claim 2, wherein the computing step comprises the steps of:

determining a desired strength for each component vector;

for each component vector, multiplying a desired strength of each component vector by the associated component vector;

summing the results obtained in the step of multiplying, wherein the sum represents the configuration vector; and optimizing the configuration vector with respect to the desired configuration by selecting a configuration as close as possible to the ideal configuration.

7. The method as recited in claim 2, wherein the computing step comprises the steps of:

determining a desired strength for each component vector;

for each component vector, multiplying the desired strength of each component vector by an associated component vector; and summing the results obtained in the step of multiplying, wherein the sum represents the configuration vector; and optimizing the configuration vector with respect to the desired configuration by selecting a configuration as close as possible to the intended use.

8. The method as recited in claim 1, wherein the use vector is characterized by a unit vector that defines a direction.

9. The method as recited in claim 1, wherein a selecting step is done by controlling a magnitude and a direction of the configuration vector such that a predetermined number of actual configurations appear around the chosen configuration vector.

* * * * *